United States Patent [19]

Sato

[11] 3,921,072

[45] Nov. 18, 1975

[54] SELF-ADAPTIVE EQUALIZER FOR MULTILEVEL DATA TRANSMISSION ACCORDING TO CORRELATION ENCODING

[75] Inventor: Yoichi Sato, Tokyo, Japan

[73] Assignee: Nippon Electric Company, Ltd., Tokyo, Japan

[22] Filed: Mar. 18, 1974

[21] Appl. No.: 452,162

[30] Foreign Application Priority Data

Mar. 20, 1973 Japan .................................. 48-32894

[52] U.S. Cl. .................. 325/42; 235/181; 325/323; 325/326; 325/477; 333/28 R

[51] Int. Cl.$^2$ ......................... H04B 3/14; H04B 1/10

[58] Field of Search ................ 235/181; 333/18, 28; 325/42, 323, 326, 477; 328/167

[56] References Cited

UNITED STATES PATENTS

| | | | |
|---|---|---|---|
| 3,388,330 | 6/1968 | Kretzmer | 325/42 |
| 3,508,153 | 4/1970 | Gerrish et al. | 325/42 |
| 3,715,665 | 2/1973 | Chang | 325/42 |
| 3,715,666 | 2/1973 | Mueller et al. | 325/42 |
| 3,715,670 | 2/1973 | Hirsch et al. | 325/42 |
| 3,736,414 | 5/1973 | McAuliffe | 235/181 |
| 3,781,720 | 12/1973 | Mueller | 325/42 |
| 3,798,560 | 3/1974 | Taylor | 328/167 |

*Primary Examiner*—Felix D. Gruber
*Attorney, Agent, or Firm*—Sughrue, Rothwell, Mion, Zinn & Macpeak

[57] ABSTRACT

A self-adaptive equalizer comprises a transversal filter wherein the attenuators are adjusted with reference to the output signals of the filter. For use in a multilevel data transmission system according to correlative encoding, a first filter removes the correlation encoding from the transversal filter outputs. Means is provided for producing binary signals representative of the signs of the first filter outputs. A second filter encodes the binary signals in accordance with the correlative encoding. The attenuators are adjusted in compliance with the respective products of the difference between one each of the second and transversal filter outputs and the signals derived from those taps of the delay line of the transversal filter to which the relevant attenuators are connected.

4 Claims, 3 Drawing Figures

SELF-ADAPTIVE EQUALIZER FOR MULTILEVEL DATA TRANSMISSION ACCORDING TO CORRELATION ENCODING

BACKGROUND OF THE INVENTION

This invention relates to a self-adaptive equalizer for use in a multilevel data transmission system according to correlative encoding.

In a data transmission system, data signals produced at a transmitting end are sent to a receiving end through a transmission path having certain inevitable distortion characteristics. The data signals received at the receiving end are therefore subjected to undesirable intersymbol interference. In order to remove the intersymbol interference, use is made of an automatic equalizer which generally comprises a transversal filter comprising, in turn, a tapped delay line supplied with the distorted data signals and variable attenuators connected to the taps of the delay line. The equalizer further comprises means for automatically adjusting the amounts of attenuation of the attenuators to minimize the intersymbol interference in the output signals of the equalizer. There are many conventional manners of adjusting the amounts of attention. In any event, it is necessary in equalizing a transmission path of unknown distortion characteristics to know the original data signals supplied to the transmission path besides the distorted data signals supplied to the equalizer. It is, however, impracticable to estimate the correct data signals from the output signals of the equalizer at the beginning of operation of the equalizer, when the overall characteristics of the transmission path and the equalizer are still subject to considerable distortion. This renders it impossible to adjust the amounts of attenuation without fail. Such circumstances are frequently met with upon sudden changes in the transmission path, such as will occur upon interswitching between the transmission paths and regular maintenance thereof.

In addition, no self-adaptive equalizer has been satisfactorily operable at a receiving end of a multilevel data transmission system according to correlative encoding.

SUMMARY OF THE INVENTION

It is therefore an object of the present invention to provide a self-adaptive equalizer having a transversal filter coupled to a transmission path for multilevel data transmission according to correlative encoding, wherein it is possible to make the amounts of attenuation of the attenuators contained in the transversal filter converge to optimum values even at the beginning of operation of the equalizer.

It is another object of this invention to provide a self-adaptive equalizer of the type described, satisfactorily operable even when the data signals are subjected to considerable distortion during transmission though the transmission path.

It is still another object of this invention to provide a self-adaptive equalizer of the type described, capable of making the amounts of attenuation converge to optimum values within a short period of time.

It is a further object of this invention to provide a selfadaptive equalizer of the type described, operable at a receiving end of a multilevel data transmission system according to partial response encoding.

In the manner known in the art, a self-adaptive equalizer for equalizing baseband signals derived from data signals supplied through a transmission path of a data transmission system comprises a transversal filter comprising, in turn, a tapped delay line supplied with the baseband signals, a plurality of variable attenuators connected to the respective taps of the delay line, and an adder for summing the output signals of the attenuators. The equalizer further comprises means for adjusting the attenuators with reference to transversal filter output signals.

In this invention for use in a multilevel data transmission system according to correlative encoding, the means for adjusting the attenuators comprises a first filter for removing the correlative encoding from the transversal filter output signals to produce first filter output signals, means responsive to the first filter outpupt signals for producing binary signals representative of the signs of the first filter output signals, a second filter for encoding the binary signals according to the correlative encoding to produce second filter output signals, means for producing difference signals representative of the difference between the transversal filter output signals and the second filter output signals, and means for adjusting the attenuators in compliance with the respective products of each of the difference signals and signals derived from those taps of the delay line to which the relevant attenuators are connected.

DESCRIPTION OF THE PREFERRED EMBODIMENTS

Figures 1, 2, 3:
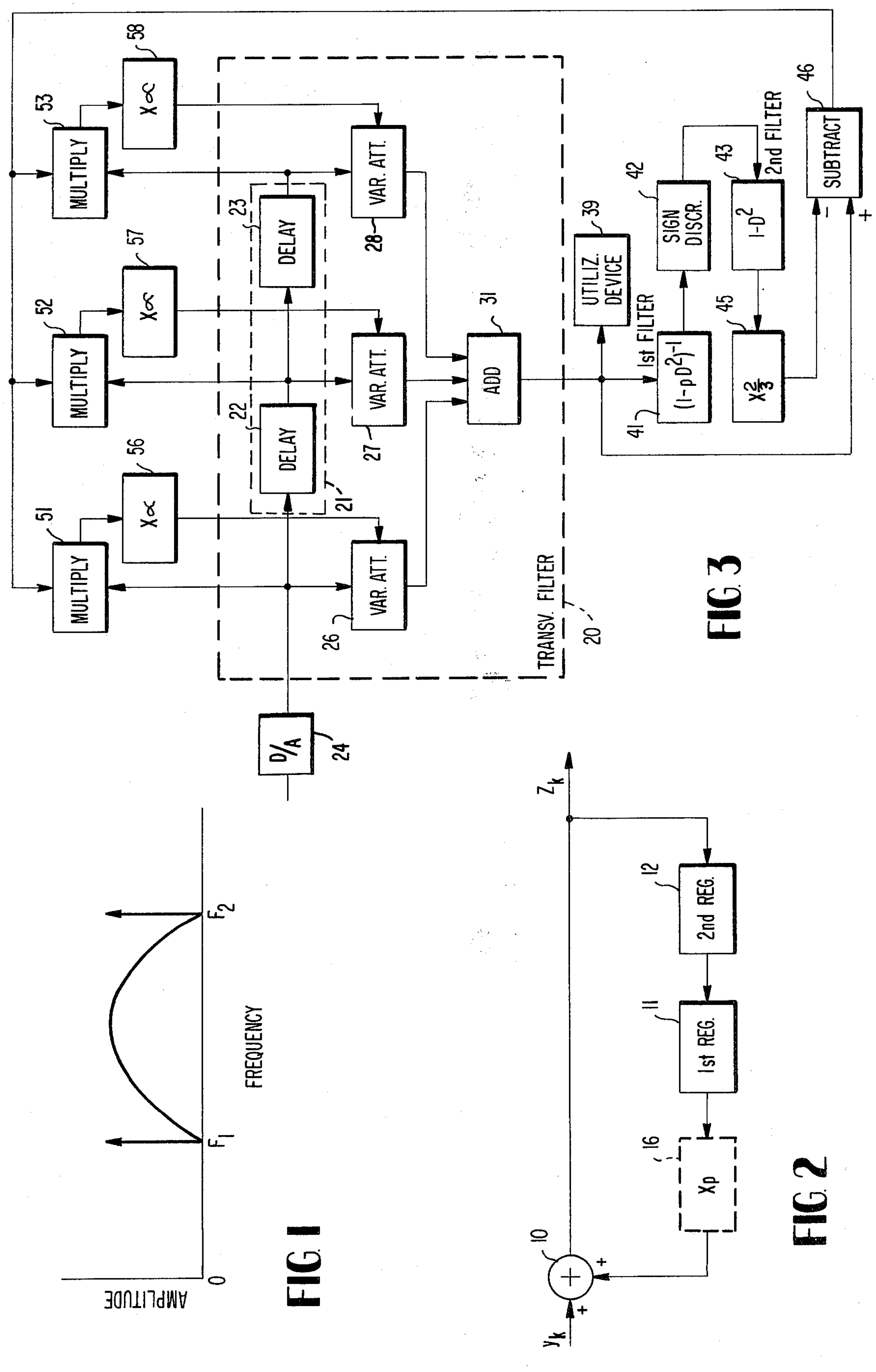
FIG. 1 shows a frequency spectrum for data signals to be encoded in accordance with class IV partial response encoding.
FIG. 2 is a block diagram of a filter for removing correlative encoding from correlative encoded signals.
FIG. 3 is a block diagram of an embodiment of the instant invention.

Before setting forth the principles of the present invention, a brief description will be given of a multilevel data transmission system according to correlative encoding, wherein multilevel data signals generated at an information source are transmitted to a receiving end through a transmission path with a predetermined correlation given to the data signals generated at a predetermined time interval. Among various types of correlative encoding, one that is widely in use at present in class IV partial response encoding described by E. R. Kretzmer in "IEEE Trans.," Volume COM-14 (February 1966), pages 67 to 68, under the title of "Generalization of a Technique for Binary Data Communication." With this manner of encoding, a multilevel data $A_k$ generated at an information source at a time $t = kT$ is encoded into a correlation code $B_k$ with a time correlation defined by:

$$B_k = A_k - A_{k-2},$$

where $T$ represents a code interval between next adjacent multilevel data and $k$ represents integers which theoretically vary from negative infinity to positive infinity. This encoding is equivalent to making the multilevel data $A_k$ pass through a filter whose transmission function is defined by $1 - D^2$, where $D$ represents a delay operator corresponding to the code interval $T$. The correlation codes $B_k$ are usually subjected either to the single side band modulation or the vestigial side band modulation to provide data signals supplied to the transmission path.

Referring to FIG. 1, one of the advantages of the class IV partial response encoding is the feasiblility of using two pilot signals of those frequencies $F_1$ and $F_2$ within the operating frequency band of the data transmission system at which zeroes are reached by the frequency spectrum of the data signals supplied to the transmission path. With the pilot signals transmitted together with the data signals, it is possible to extract the pilot signals at the receiving end without being subjected to severe interference by the data signals distorted during transmission and to regenerate from the pilot signals the carrier signal and timing signals to be used at the receiving end.

If the data signals were not subjected to distortion during transmission through a transmission path, samples obtained by sampling by the use of the timing signals the baseband signals derived by demodulating the data signals would be in exact coincidence with the correlation code $B_k$ from which the original multilevel data $A_k$ could be derived through the precode method described by J. F. Gunn in "BSTJ," Volume 50, No. 2 (February 1971), pages 501 to 520, under the title of "Master-group Digital Transmission on Modern Coaxial Systems." It is therefore the object of the automatic equalization in a multilevel data transmission system according to correlative encoding to remove the intersymbol interference from the baseband signals, thereby enabling the correct correlation codes $B_k$ to be obtained.

An example will now be given of the principles of conventional self-adaptive equalization that may be used at a receiving end of a data transmission system according to correlative encoding. Let the samples of the baseband signals be designated by $r_k$ while the amounts of attenuation given by a plurality of variable attenuators, 2N+1 in number, connected to a tapped delay line of a transversal filter of the equalizer be designated by $C_{-N} \ldots, C_0 \ldots$, and $C_N$. It is possible to successively adjust the amounts of attenuation in accordance with a set of equation:

$$\begin{bmatrix} C_N^{m+1} \\ \cdot \\ \cdot \\ C_0^{m+1} \\ \cdot \\ \cdot \\ C_{-N}^{m+1} \end{bmatrix} = \begin{bmatrix} C_N^{m} \\ \cdot \\ \cdot \\ C_0^{m} \\ \cdot \\ \cdot \\ C_{-N}^{m} \end{bmatrix} - \alpha \begin{bmatrix} r_{k-N} \\ \cdot \\ \cdot \\ r_k \\ \cdot \\ \cdot \\ r_{k+N} \end{bmatrix} (y_k - \hat{B}_k), \qquad (1)$$

where $m$ represents the number of times of the adjustment, $\alpha$ is a predetermined small positive constant, $y_k$ represents the output signals of the equalizer or of the transversal filter, namely, $$y_k = \sum_{i=-N}^{N} r_{k-i} C_i,$$

and $\hat{B}_k$ represents an estimation for the correlation code $B_k$ presumed from the output signals $y_k$. If the estimation $\hat{B}_k$ were already in coincidence with the correlation code $B_k$, the adjustment would correctly be carried out by the use of equation (1) to eventually reach the optimum amounts of attenuation which give the least mean square error between the output signals $y_k$ and the correlation codes $B_k$. In other words, these optimum amounts of attenuation render the mean value of a criterion $$\sum_{i=-\infty}^{\infty} (r_{k-i} C_i - B_k)^2 \qquad (2)$$

with respect to time minimum. It should, however, be pointed out that the output signals $y_k$ are subjected to severe intersymbol interference at the beginning of operation of the equalizer so that the estimation $\hat{B}_k$ is far from being equal to the correlation code $B_k$. This makes it impossible to pull the equalizer into convergence.

The principles will now be described of a self-adaptive equalizer according to this invention that is capable of removing the impossibility. Let $x_k$ represent an infinite series of those samples of a unit impulse response which appear at the output terminal of the equalizer. The output signals $y_k$ of the equalizer is given by:

$$y_k = \sum_i h_{k-i} B_i = \sum_i h_{k-i} A_i - \sum_i h_{k-2-i} A_i, \qquad (3)$$

where $$h_k = \sum_{i=-N}^{N} x_{k-i} C_i.$$

The output signals $y_k$ are thus derived by causing that signal $\Sigma h_{k-i} A_i$ in equation (3) which is given by superposition of the intersymbol interference on a multilevel datum $A_k$ generated at the information source to pass through a digital filter whose transmission function is specified by $1 - D^2$. The signals given by superposition of the intersymbol interference on the multilevel datum is equivalent to that output signal of the transversal filter from which the correlative encoding is removed. It is therefore feasible to construct a self-adaptive equalizer for removing the intersymbol interference at a receiving end of a multilevel data transmission system according to class IV partial response encoding if it is possible to realize a filter whose transmission function is defined by $(1 - D^2)^{-1}$.

In order to further elucidate the principles of the self-adaptive equalizer for class IV partial response encoded data signals, let it be assumed that the number of levels of the multilevel data $A_k$ is $L$ and that the multilevel data $A_k$ are sufficiently scrambled. An error $e_k$ of the output signal $y_k$ of the equalizer may be defined by:

$$e_k^2 = \left( \sum_{i=-N}^{N} r_{k-i} C_i - 2V[\mathrm{sign}(\Sigma h_{k-i} A_i) - \mathrm{sign}(\Sigma h_{k-2-i} A_i)]/3 \right)^2, \qquad (4)$$

where V represents a constant given by $d$L, $d$ being the level interval selected for the estimation $\hat{B}_k$ at the receiving end, and sign$(X)$ is a function that is equal to 1 and $-1$ when $X \geqq 0$ and $X < 0$, respectively. The amounts of attenuation $C_i$ that render the mean value of the squares of the error $e_k$ with respect to time minimum also make the criterion given by equation (2) minimum. The problem here is now to find out formulae for adjusting the amounts of attenuation so as to make the time average of the squares of the errors $e_k$ converge to zero.

In correspondence with equation (1), the formulae presently sought for may be given by:

$$\begin{bmatrix} C_N^{m+1} \\ \cdot \\ \cdot \\ \cdot \\ C_O^{m+1} \\ \cdot \\ \cdot \\ \cdot \\ C_{-N}^{m+1} \end{bmatrix} = \begin{bmatrix} C_N^{m} \\ \cdot \\ \cdot \\ \cdot \\ C_O^{m} \\ \cdot \\ \cdot \\ \cdot \\ C_{-N}^{m} \end{bmatrix} - \alpha \begin{bmatrix} r_{k-N} \\ \cdot \\ \cdot \\ \cdot \\ r_k \\ \cdot \\ \cdot \\ \cdot \\ r_{k+N} \end{bmatrix} (\Sigma\, r_{k-i} C_i^m - 2V[\mathrm{sign}(\Sigma\, h_{k-i}^m A_i) - \mathrm{sign}(\Sigma h_{k-2-i}^m A_i)]\tfrac{1}{3}), \quad (5)$$

where $$h_k^m = \sum_{i=-N}^{N} x_{k-i} C_i^m.$$

The values to which the respective amounts of attenuation are made to converge in compliance with equation (5) make the time average of the squares of the errors $e_k$ minimum and the criterion given by equation (2) also minimum. In this connection, it should be pointed out that satisfaction of an inequality $$\sum_{k \neq O} |x_k| < |x_O| \quad (6)$$

is a sufficient condition for reliable convergence of the adjustment of the amounts of attenuation. In case the number of the multilevel is two, inequality (6) holds when the peak eye is open. It is possible to prove that the intersymbol interference is removed by adjusting the amounts of attenuation in accordance with equation (5) under inequality (6) for whatever mutilevel data transmission according to any correlative encoding.

Referring now to FIG. 2, a digital filter of a recursive type whose transmission function is defined by $(1 - D^2)^{-1}$ comprises an addition circuit 10 having first and second input terminals and an output terminal. The output signals $y_k$ of the transversal filter (not shown) of the equalizer are successively supplied to the first input terminal of the addition circuit 10. The digital filter further comprises a first register 11 for supplying a feedback signal to the second input terminal of the addition circuit 10 and a second register 12 connected to the output terminal of the addition circuit 10 for successively registering signals $z_k$ produced by the addition circuit 10 for one sampling time interval. The first register 11 successively registers the signals registered by the second register 12 at the next previous sampling time. The signals $z_k$ produced by the addition circuit 10 are the output signals of the digital filter.

In connection with the digital filter illustrated with reference to FIG. 2, a first problem is the fact that initial signals $m_1$ and $m_2$ registered in the first and second registers 11 and 12 at the beginning of operation always remain in the output signals $z_k$ of the digital filter. A second problem is unwanted accumulation of the errors.

Describing the first problem more in detail, the outupt signals of the digital filter are given by:

$$z_{2n+1} = y_{2n+1} + z_{2n-1} + m_1 = \Sigma\, h_{2n+1-i} A_i - \Sigma\, h_{1-i} A_i + m_1$$

for $k = 2n + 1$ (odd sampling time points) and $$z_{2n} = y_{2n} + z_{2n-2} + m_2 = \Sigma\, h_{2n-i} A_i - \Sigma\, h_{-i} A_i + m_2$$

for $k = 2n$ (even sampling time points). In practice, the initial signals $m_1$ and $m_2$ are the signals registered in the first and second registers 11 and 12 at the time $k = 0$. It is therefore necessary for making the digital filter produce the desired output signals $$z_{2n+1} = \Sigma\, h_{2n+1-i} A_i$$
$$z_{2n} = \Sigma\, h_{2n-i} A_i$$

that $$\left.\begin{aligned} m_1 &= \Sigma\, h_{1-i} A_i \\ m_2 &= \Sigma\, h_{-i} A_i \end{aligned}\right\} \quad (7)$$

hold at the beginning of operation. If the time average of the multilevel data $A_k$ generated at the information source is equal to zero, it is possible to make equations (7) hold by subtracting a certain value from the output signals $z_k$ of the digital filter illustrated with reference to FIG. 2 so that the time average of the output signals $z_{2n+1}$ and $z_{2n}$ may be both zero. This subtraction is equivalent to substitution of $(1 - pD^2)^{-1}$ for $(1 - D^2)^{-1}$, where $p$ is a constant smaller than unity but is nearly equal to unity. The substitution may be carried into effect by inserting a multiplier circuit 16 depicted in FIG. 2 with dashed lines between the second input terminal of the addition circuit 10 and the first register 11 for multiplying the feedback signal by the constant $p$. This substitution also avoids the unwanted error accumulation. The constant p may be determined within a desired range of efficiency of the equalizer in consideration of other variables for the design of the equalizer. More particularly, a larger value of the constant $p$ results in necessity of a longer time to attain the convergence. On the other hand, a smaller value of the constant $p$ renders the residual error of the equalizer larger. In general, the constant $p$ may be selected between 0.95 and 0.995.

Referring to FIG. 3, it is assumed that data signals are transmitted through a transmission path according to class IV partial response encoding and that baseband signals derived from the data signals are subjected to analog-to-digital conversion. A self-adaptive equalizer depicted in FIG. 3 comprises a transversal filter 20 comprising, in turn, a tapped delay line 21 connected to a digital-to-analog converter 24 for producing the digital baseband signals and including two delay circuits 22 and 23 for successively delaying the digital baseband signals by one code interval each. The transversal filter further comprises variable attenuators 26, 27, and 28 connected to the taps of the delay line 21 for attenuating the undelayed and delayed baseband signals derived from the respective taps to produce amplitude adjusted baseband signals, and an adder 31 for summing the amplitude adjusted baseband signals. When the attenuators 26 through 28 are adjusted to the respective optimum values, the output signals of the adder 31 have minimized intersymbol interference and are the desired equalized baseband signals. The transversal filter output signals, namely, the output signals of the adder 31, are supplied to a utilization device 39 which may be a circuit for deriving correlation codes $B_k$ from the transversal filter output signals. The equalizer comprises a first filter 41 having a transmission function $(1 - pD^2)^{-1}$ constructed in the manner illustrated with reference to FIG. 2 for removing the class IV partial response encoding from the transversal filter output signals to produce first filter output signals, a polarity discriminator 42 responsive to the first filter output signals for producing binary signals of predetermined positive and negative values when the signs of the first filter output signals are positive and negative, respectively, a second filter 43 having a transmission function $1 - D^2$ for encoding the binary signals in accordance with the class IV partial response encoding to produce second filter output signals, a single multiplier 45 for multiplying the second filter output signals by a factor ⅔ appearing in equation (5) to produce modified second filter output signals, and a subtractor 46 for subtracting the modified second filter output signals from the transversal filter output signals to derive difference signals. The equalizer further comprises a plurality of multipliers 51, 52, and 53 connected to the respective taps of the delay line 21 and to the subtractor 46 for deriving product signals representative of the products of each of the difference signals and the baseband signals derived from the respective taps, and a like number of auxiliary attenuators 56, 57, and 58. These attenuators are interposed between the corresponding multipliers 51 through 53 and the respective variable attenuators 26 through 28 for multiplying the product signals by the constant $\alpha$ to produce amplitude adjusted product signals, which are supplied to the variable attenuators 26 through 28 to adjust the latter in accordance with equation (5).

In case the analog-to-digital converter put prior to the transversal filter is omitted, use should be made of a first filter for analog signals constructed according to FIG. 2. Although only two delay circuits 22 and 23 are shown in FIG. 3, the number of the delay circuits is preferably from twenty to forty in practice.

While an embodiment of this invention and modifications thereof have thus far been described in conjunction with class IV partial response encoding, it is readily possible to adapt the embodiment to other correlative encoding by modifying the first filter illustrated with reference to FIG. 2 with substitution of an appropriate delay line for the first and second registers 11 and 12 shown therein.

Incidentally, it was possible with an equalizer according to this invention to make the amounts of attenuation converge to the respective optimum values without about nine thousand code intervals. This corresponds to 50 milliseconds in case the data signals are transmitted by PCM FDM transmission of 6.312 megabits per second and may be said to be short enough although no conventional equalizer is available as a reference for use in a multilevel data transmission according to partial response encoding.

What is claimed is:

1. In a self-adaptive equalizer for equalizing baseband signals derived from data signals of a multilevel data transmission system according to correlative encoding, including a transversal filter comprising, in turn, a delay line supplied with said baseband signals, a plurality of variable attenuators connected to the respective taps of said delay line, and an adder for summing up output signals of said variable attenuators to produce transversal filter output signals, wherein the improvement comprises, a first filter for removing said correlative encoding from said transversal filter output signals to produce first filter output signals of positive and negative signs, means responsive to said first filter output signals for producing binary signals representative of the signs of said first filter output signals, a second filter for encoding said binary signals in accordance with said correlative encoding to produce second filter output signals, means for producing difference signals representative of the differences between said transversal fitler output signals and the second filter output signals, and means for adjusting said variable attenuators in compliance with the respective products of each of said difference signals and baseband signals derived from those taps of said delay line to which the relevant variable attenuators are connected.

2. In an equalizer as claimed in claim 1, said baseband signals being digital signals spaced apart by a unit time interval for said correlative encoding, wherein said first filter comprises an addition circuit having a first input terminal supplied with said transversal filter output signals, a second input terminal, and an output terminal for producing said first filter output signals, a delay line for delaying said first filter output signals by a time equal to that predetermined multiple of said unit time interval which is used in said correlative encoding to produce delayed output signals, a circuit for multiplying said delayed output signal by a predetermined constant to produce modified delayed signals, and means for supplying said modified delayed signals to the second input terminal.

3. In an equalizer as claimed in claim 2, said correlative encoding being class IV partial response encoding, wherein said delay line of said first filter comprises a first register and a second register, said second register capable of delaying said first filter output signals for said unit time interval to produce once delayed signals, said first register capable of delaying said once delayed signals for said unit time interval to produce said delayed output signals supplied to said multiplication circuit.

4. In an equalizer as claimed in claim 1, wherein said variable attenuator adjusting means comprises a plurality of multipliers connected to the respective taps of said delay line and to said second filter for multiplying baseband signals derived from the respective taps by each of said difference signals to produce product signals representative of the respective products of the last-mentioned baseband signals and said each difference signal, auxiliary attenuators exhibiting a predetermined amount of attenuation for producing amplitude adjusted product signals, and means for supplying said amplitude adjusted product signals to said variable attenuators.

* * * * *